(12) United States Patent
Bazin et al.

(10) Patent No.: US 10,728,427 B2
(45) Date of Patent: Jul. 28, 2020

(54) APPARATUS, SYSTEMS AND METHODS FOR NONLINEAR SYNCHRONIZATION OF ACTION VIDEOS

(71) Applicant: Disney Enterprises, Inc., Burbank, CA (US)

(72) Inventors: Jean-Charles Bazin, Burbank, CA (US); Alexander Sorkine-Hornung, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/380,827

(22) Filed: Dec. 15, 2016

(65) Prior Publication Data

US 2018/0176423 A1 Jun. 21, 2018

(51) Int. Cl.
| | |
|---|---|
| *G06K 9/00* | (2006.01) |
| *H04N 5/04* | (2006.01) |
| *G06T 7/215* | (2017.01) |
| *G06T 7/246* | (2017.01) |
| *G06K 9/46* | (2006.01) |

(52) U.S. Cl.
CPC ............ *H04N 5/04* (2013.01); *G06K 9/00758* (2013.01); *G06K 9/46* (2013.01); *G06T 7/215* (2017.01); *G06T 7/248* (2017.01); *G06T 2207/10016* (2013.01); *G06T 2207/30241* (2013.01)

(58) Field of Classification Search
CPC .......... G06T 1/0021; G06T 2201/0064; H04N 2005/91335; H04N 21/2541; H04N 21/42684; H04N 21/4334; H04N 21/438; H04N 21/4627; H04N 21/8358; H04N 21/845; H04N 5/913; H04N 9/8042; H04N 9/8063
USPC ................................ 382/100, 103, 107, 158
See application file for complete search history.

(56) References Cited

U.S. PATENT DOCUMENTS

| | | | | |
|---|---|---|---|---|
| 2006/0276983 | A1* | 12/2006 | Okamoto | H04N 17/00 702/69 |
| 2012/0327243 | A1* | 12/2012 | Rezvani | H04N 7/12 348/158 |
| 2013/0259228 | A1* | 10/2013 | Ren | H04L 9/3247 380/200 |
| 2013/0301872 | A1* | 11/2013 | Flaharty | H04N 5/913 382/100 |
| 2016/0055381 | A1* | 2/2016 | Adsumilli | G06K 9/00751 386/241 |
| 2016/0110453 | A1* | 4/2016 | Kim | G06F 17/30793 707/749 |
| 2017/0220854 | A1* | 8/2017 | Yang | G06K 9/6288 |
| 2017/0229154 | A1* | 8/2017 | Bose | G06K 9/00711 |

* cited by examiner

*Primary Examiner* — Solomon G Bezuayehu
(74) *Attorney, Agent, or Firm* — Fay Kaplun & Marcin, LLP

(57) ABSTRACT

Described herein are apparatus, systems and methods for synchronizing a reference video with an input video. A method comprises extracting first motion data from the input video having a first set of frames, extracting second motion data from the reference video having a second set of frames, computing motion descriptors for each frame in the first set of frames and the second set of frames based on the first and second motion data, respectively, and non-linearly mapping the first set of frames to the second set of frames based on the motion descriptors, respectively.

20 Claims, 8 Drawing Sheets

System 800

APPARATUS, SYSTEMS AND METHODS FOR NONLINEAR SYNCHRONIZATION OF ACTION VIDEOS

BACKGROUND

Video synchronization aims to temporarily align a set of input videos acquired by multiple cameras. Video synchronization may be a fundamental step for many applications in computer vision, such as three-dimensional ("3D") reconstruction from multiple cameras, video morphing, facial performance manipulation, spatial compositing, motion analysis, etc. When several cameras are simultaneously used to acquire multiple viewpoint shots of a scene, then synchronization may be trivially achieved by using timecode information or camera triggers.

In the absence of timecode information and camera triggers, the videos may be synchronized using a recorded audio track, wherein the synchronization finds a fixed time offset between the cameras. Furthermore, videos may be synchronized through manual alignment, such as by finding video frame correspondence and manually computing the required time offset. However, these techniques require time-consuming manual effort for video alignment.

Existing video synchronization methods have significant limitations. For instance, existing techniques typically require simultaneously acquired viewpoint shots of a scene, videos that are acquired in the same location, a fixed temporal offset between the cameras, specific use cases (e.g., videos of faces), a similar appearance change, a combination thereof, etc.

SUMMARY

Described herein are apparatus, systems and methods for nonlinear synchronization of action videos.

A method of synchronizing a reference video with an input video may comprise extracting first motion data from the input video having a first set of frames, extracting second motion data from the reference video having a second set of frames, computing motion descriptors for each frame in the first set of frames and the second set of frames based on the first and second motion data, respectively, and non-linearly mapping the first set of frames to the second set of frames based on the motion descriptors, respectively.

Also described herein is a system comprising a processor coupled to a memory, wherein the processor is programmed for synchronizing a reference video with an input video by extracting first notion data from the input video having a first set of frames, extracting second motion data from the reference video having a second set of frames, computing motion descriptors for each frame in the first set of frames and the second set of frames based on the first and second motion data, respectively, and non-linearly mapping the first set of frames to the second set of frames based on the motion descriptors, respectively.

Further described herein is a non-transitory computer readable storage medium with an executable program stored thereon, wherein the program instructs a microprocessor to perform operations to synchronize a reference video with an input video comprising extracting first motion data from the input video having a first set of frames, extracting second motion data from the reference video having a second set of frames, computing motion descriptors for each frame in the first set of frames and the second set of frames based on the first and second motion data, respectively, and non-linearly mapping the first set of frames to the second set of frames based on the motion descriptors, respectively.

DETAILED DESCRIPTION

Figure 1:
FIG. 1 shows an example of video synchronization for videos that have different appearances according to the exemplary embodiments discussed herein.
Figure 1:
Figure 1:
Figure 1:
Figure 1:
Figure 1:
Figure 1:
Figure 1:
Figure 1:

The exemplary embodiments may be further understood with reference to the following description and the appended drawings, wherein like elements are referred to with the same reference numerals. The exemplary embodiments describe an apparatus, system and method for nonlinear synchronization of videos. More specifically, the exemplary systems and methods described herein provide synchronization of action videos where a similar action may be performed by different people at different times at different locations. Examples of the action in the videos may include, but are not limited to, weight lifting exercises, baseball pitch, dance, etc. Since the action may take place at different locations, the existing methods using conventional appearance-based techniques are not appropriate.

Initially, it is noted that the action being similar, the people being different, the people performing the action, the different times, and the different locations is only exemplary. The exemplary embodiments may also be applied to synchronization of action videos where the actions being performed are capable of being synchronized. That is, the actions that are performed being similar is only an example of actions that are capable of being synchronized. The exemplary embodiments may also be applied to the same person performing the actions in different action videos. The exemplary embodiments may further be applied to non-person performers and may be any living being or object that performs the actions (e.g., jumping tigers, birds flapping wings, dancing robots, articulated objects, etc.). The exemplary embodiments may additionally be applied to action videos that occur at the same or different times as well as the same or different locations.

As noted above, video synchronization may be utilized to align a set of input videos in any number of computer vision applications, such as, but not limited to, video morphing, motion analysis, etc. According to one embodiment, exemplary apparatuses, systems and methods may extend existing methods with general motion information and compute a nonlinear synchronization path of the input videos to establish frame-to-frame temporal correspondence. These exemplary systems and methods may be applied to video synchronization, video annotation, action snapshots, etc.

As will be described in greater detail below, the exemplary systems and methods may synchronize videos of a same or similar action performed by different people at different times and location. In other words, as illustrated in FIG. 1, the systems and methods may synchronize videos that have different appearances. Specifically, FIG. 1 shows a first video sequence 110 from a first input video of a specific action and a second video sequence 120 from a second input video of a similar action. According to the example, the action may be a "snake arm" dance performed by different people at different times and locations.

The exemplary systems and methods described herein may compute a nonlinear synchronization path of these two videos 110, 120 based on motion cues. For instance, motion information pertaining to both videos 110, 120 may be obtained through techniques such as point trajectory extraction in which point trajectories of a multiple temporal span are determined (which may be used to determine displacement trajectories that are normalized), which will be described in detail below. The exemplary nonlinear synchronization path may account for local speed variations of the shared action. The synchronization path may then be used to synchronize the videos such that the actions of the dance appears to occur at the same time in a retimed video sequence 130. Thus, this synchronization path may be used to generate a new version of the input videos where the first and second video sequences 110, 120 may be overlayed in the retimed video sequence 130. Despite the fact that the appearance of the first and second input videos may look very different, a viewer may observe that the exemplary systems and methods may synchronize the motion (e.g., snake arms movements) of both video sequences 110, 120.

The exemplary systems and methods utilize a novel approach that allows for nonlinear synchronization of videos depicting the same or similar actions. Through the use of techniques such as point trajectory, these systems and methods may avoid the need to use conventional silhouette or skeleton extraction techniques. In addition, a multi-temporal scale method may be implemented to accommodate any input videos of large speed differences (e.g., 10 times speed differential). Furthermore, these exemplary systems and methods may be applied to any number of applications beyond video synchronization, such as, but not limited to, video annotation, action snapshots, etc.

As noted above, exemplary embodiments of the systems and methods described herein may relate to synchronization, temporal ordering and temporal correspondence. Related methods may include simultaneous acquisition, video-based synchronization, additional modalities (e.g., human motion capture data), image sequence ordering, action recognition, etc.

When a scene is simultaneously captured by several cameras, camera triggers may be used to start the acquisition of all the cameras at the same time. Therefore, the captured videos may be directly synchronized. In the absence of camera triggers, the cameras may start the acquisition at different times. In such an instance, synchronization may be reduced to a fixed temporal offset, or a fixed speed scalar for cameras of different framerates. However, when the actions are performed at different time instances (e.g., by different people and/or at different places), the video cannot be captured simultaneously. As a consequence, camera triggers timecode information and/or audio signals may not be used for synchronization. Moreover, since the local speed may vary during the action, actions at different times or locations may not be related by a fixed temporal linear relation (e.g., a fixed temporal offset, fixed global speed factor, etc.). Accordingly, the exemplary systems and methods described herein cope with the local speed change variations by performing nonlinear synchronization.

Figure 2:
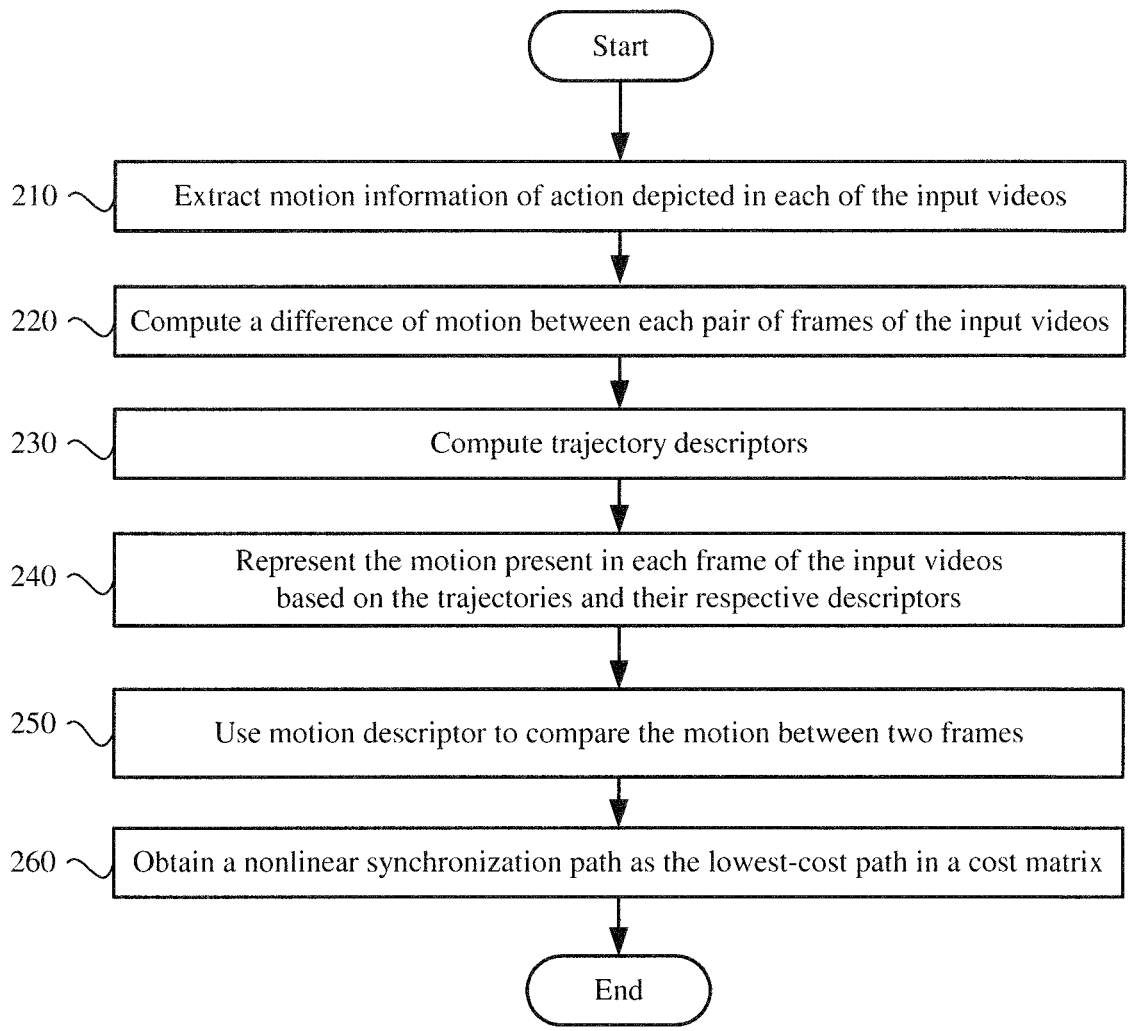
FIG. 2 shows an exemplary method for achieving nonlinear synchronization of action videos according to the exemplary embodiments discussed herein.

Specifically, the exemplary systems and methods establish temporal correspondence between the frames of action videos in order to synchronize the action videos. FIG. 2 shows an exemplary method 200 for achieving nonlinear synchronization of action videos. As noted above, a linear time mapping may not be applicable for the input videos due to local speed change variations. Instead, the method 200 may determine a nonlinear temporal mapping that may serve as the low cost path in a cost matrix. Specifically, the exemplary input may be a set of videos of the same or similar actions. One of these videos may be considered a reference video, and the goal is to synchronize the other video(s) to this reference video. The low cost path may be constrained to estimate a global time offset, speed ratio, or affine mapping. The low cost path may also have some constrained frame correspondences.

For instance, $v_1$ and $v_2$ may be two input videos, wherein $v_i(j)$ may be the j-th frame of video $v_i$. Accordingly, the synchronization may be defined as a mapping $p: R \rightarrow R^2$, wherein $p(t)=(p_1(t), p_2(t))$ associates a global time t with two corresponding video frames $v_1(p_1(t))$ and $v_2(p_2(t))$. As linear time mapping may not be applicable in the exemplary embodiments due to the local speed change variations, a nonlinear temporal mapping may be computed as the low cost path in a cost matrix.

It is noted that while the exemplary method 200 describes the synchronization of two input videos, one skilled in the art will understand that any number of input videos may be utilized for synchronization. For instance, in the case of three or more input videos, each of the videos may be independently synchronized to a designated or arbitrary reference video.

Initially, in step 210, the motion information of the action depicted in each of the input action videos is extracted. For instance, the motion information may be extracted using point trajectory extraction. Accordingly, the motion information is obtained in the form of point trajectories by tracking. These point trajectories may then be represented by multi-temporal scale motion descriptors.

While step 210 describes the use of point trajectory extraction, any number of techniques may be implemented for extracting and representing motion information from the input action videos. For instance, space-time interest points ("STIP"), scale-invariant feature transform ("SIFT") flow, optical flow, Kanade-Lucas-Tomasi ("KLT") feature tracking and extraction, etc.

In step 220, a difference of motion between each pair of frames of the input action videos is computed and the results are stored in a cost matrix. According to one exemplary embodiment, sample feature points may be tracked from frame to frame by median filtering on a dense optical flow field. The camera motion may be computed by homography with a random sample consensus ("RANSAC") procedure and canceled out from the optical flow. The point tracks that are consistent with the homography may be considered as due to the camera motion and thus removed. The positions of the remaining tracks may be compensated by the camera motion such that these tracks correspond to the actual motion of the action. Further compensation may be applied to limit tracking drifting.

Figure 3:
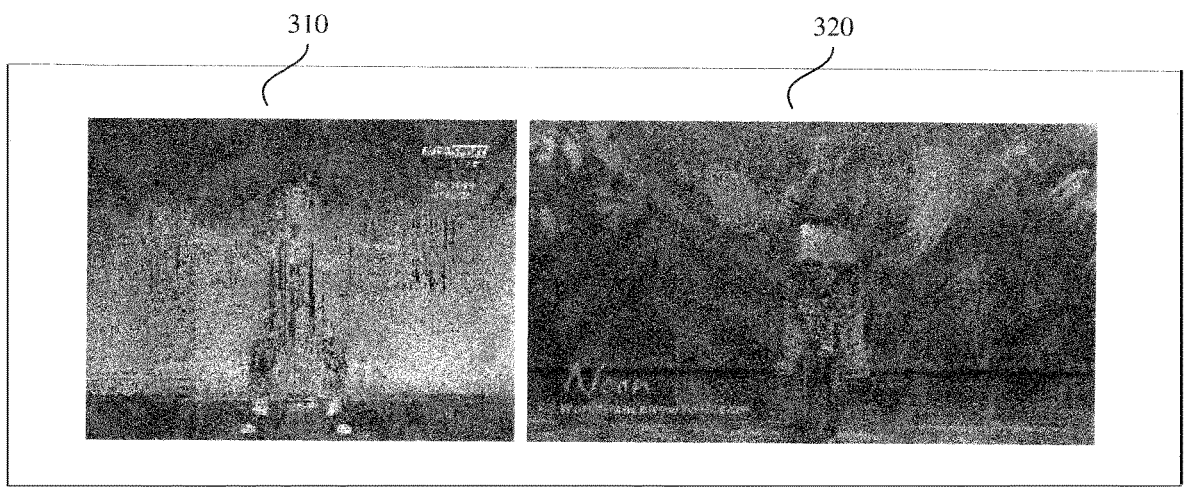
FIG. 3 shows representative examples of point trajectories of the video synchronization approach according to the exemplary embodiments discussed herein.

For instance, points may be tracked over a designated number of frames, such as over 30 frames, wherein L=30 frames. Given a starting frame at time t, the point $P_t=(x_t, y_t)$ in this frame may be tracked over the next L frames, and the resulting trajectory may thus be composed of points: ($P_t$, $P_{t+1}$, $P_{t+2}$, . . . , $P_{t+L-1}$). FIG. 3 shows representative examples 310, 320 of point trajectories of the video synchronization approach according to the exemplary systems and methods described herein.

In order to compare trajectories, in step 230, a trajectory descriptor is computed. Given a trajectory, a simple concatenation of the point positions may be sensitive to the location of the action in the image. To be location invariant, the method 200 may use displacement vectors (e.g., the change of x and y coordinates). For instance, a trajectory descriptor may be described as $S=(\Delta P_t, \ldots, \Delta P_{t+L-1})$, wherein $\Delta P_t=(x_{t+1}-x_t, y_{t+1}-y_t)$. It is noted that other descriptors or representations may be used by the exemplary embodiments such as an angle between the points of a trajectory (e.g., instead of their two-dimensional displacement vectors). The vector of the trajectory descriptor may then be normalized to accommodate videos where, for example, the action is performed at different distances from the camera, as well as videos with different amounts of zoom. In this manner, a trajectory may be determined for the frames in the input videos.

It is noted that the exemplary method 200 may be most successful when the speed of the actions is not very different. To deal with videos where the action is performed at much greater variations in speed, a multiple temporal scale approach may be used. For efficiency reasons, trajectories may not be re-tracked over different temporal windows. Instead, previously tracked trajectories may be used to compute their respective multi-temporal scale representation. Trajectory descriptors may be computed over different temporal windows center at a mid-time point of an action video. For instance, given a trajectory tracked over L frames, a point at mid-time may be considered and the trajectory descriptors S may be computed over different temporal windows W=(3, . . . , 30) centered at that mid-time. Accordingly, the multi-temporal descriptors of the trajectory may be defined as ($S_3$, . . . , $S_{30}$).

In step 240, the motion present in each frame of the input action videos may be represented based on the trajectories and their respective descriptors (e.g., trajectory descriptors). Accordingly, the motion descriptor may then be used to compare the motion between two different frames of the input videos. For example, the motion descriptor may be determined based on a histogram. The histogram may be generated based on all or a subset of the trajectories that are visible in the frames over a temporal window. For example, to compute the histogram, a bag-of-features approach may be applied. As those skilled in the art will understand, the bag-of-features approach (or also known as bag-of-words approach) may be used in natural language processing and information retrieval through a simplifying representation. According to the exemplary embodiments in which the bag-of-features approach is used, a k-means algorithm may be run on a subset of all the trajectories (via the trajectory descriptors) of the input videos to provide k centers (or centroids). The k centers may represent the k bins of the histogram. For each trajectory (and corresponding trajectory descriptor) of a current frame, the closest center may be determined such that the associated histogram bin is incremented by one. The histogram may represent the "motion descriptor" of the current frame. A multi-temporal descriptor of the motion frame may thus be obtained by applying this procedure for each temporal window.

In step 250, the motion descriptors may be used to compare the motion between two frames. Since different frames and different videos may have a different number of trajectories, the number of entries in an exemplary histogram bin may vary. Accordingly, it may be necessary to normalize the histogram. The method 200 may then compare the motions of two frames of the input video pair by measuring a distance d( ) between the respective histograms, for example, using $x^2$ distance. However, it is noted that other mechanisms to compute the distance between histograms may be used such as correlation, intersection, Bhattacharyya distance, etc. For the multi-temporal histograms, the method 200 may perform a temporal scale selection. For instance, given the multi-temporal histogram of frames $v_1(t)$ and $v_2(t')$, respectively the multiple $h_1^T(t)$ and $h_2^T(t')$ with each T ε W, a temporal scale pair (T, T') may be selected that leads to the lowest histogram distance as follows:

$$c(t, t') = \min_{(T,T') \in W \times W} d(h_1^T(t), h_2^{T'}(t')).$$

In another manner, the value of T (or T') may be fixed and a search for a value of T' (or T) may be performed that minimizes the distance.

In step 260, a nonlinear synchronization path may be obtained as the lowest-cost path in a cost matrix C. A cost variable may be a function of the motion difference between the two associated frames and may take into account potential speed differences. For instance, c(t, t') may represent the cost of the motion difference between the frames $v_1(t)$ and $v_2(t')$, taking into account potential speed differences. Accordingly, the costs c(t, t') for each pair of frames $v_1(t)$ and $v_2(t')$ may be computed and stored in a 2D cost matrix C of size $N_1 \times N_2$, wherein $N_i$ refers to the number of frames of video $v_i$.

Figure 4:
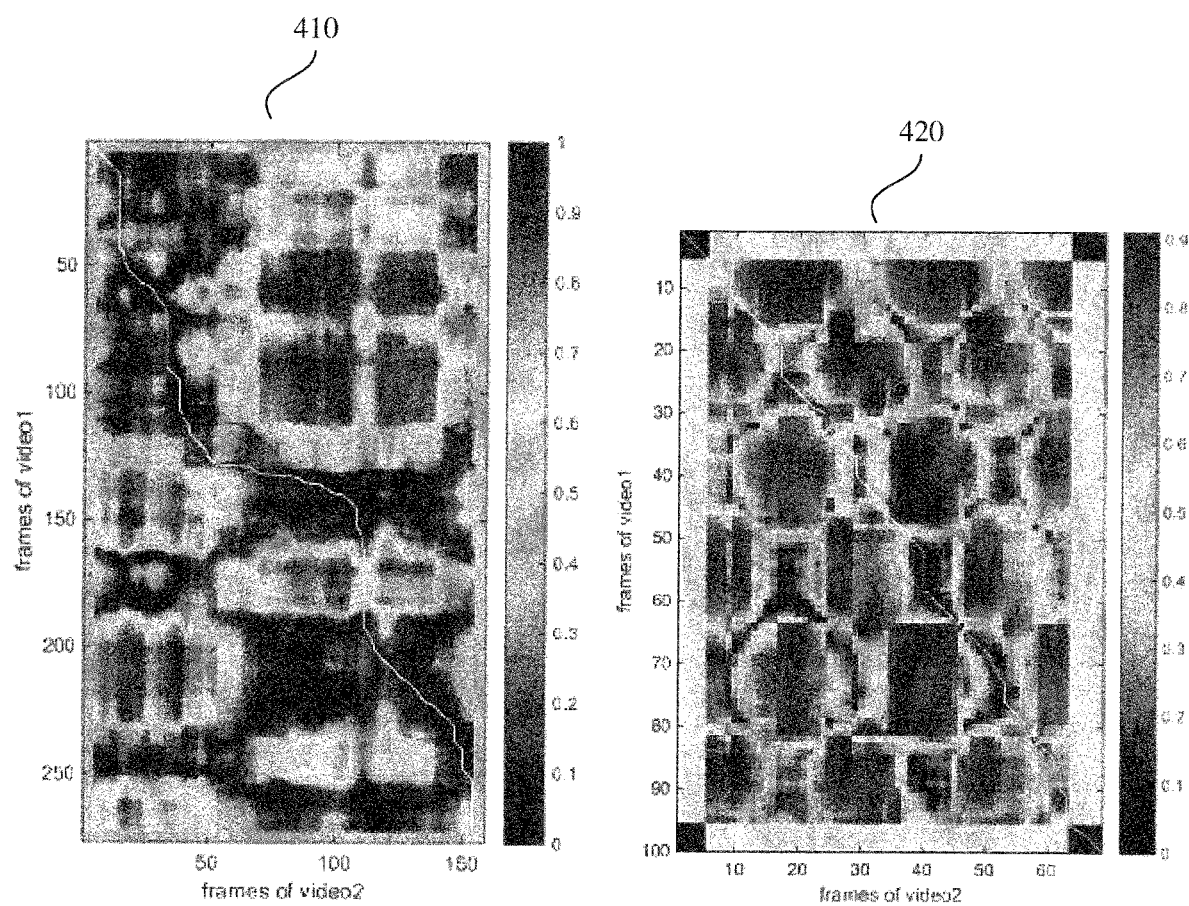
FIG. 4 shows exemplary results of cost matrices computed according to the exemplary embodiments discussed herein.
Figure 5:
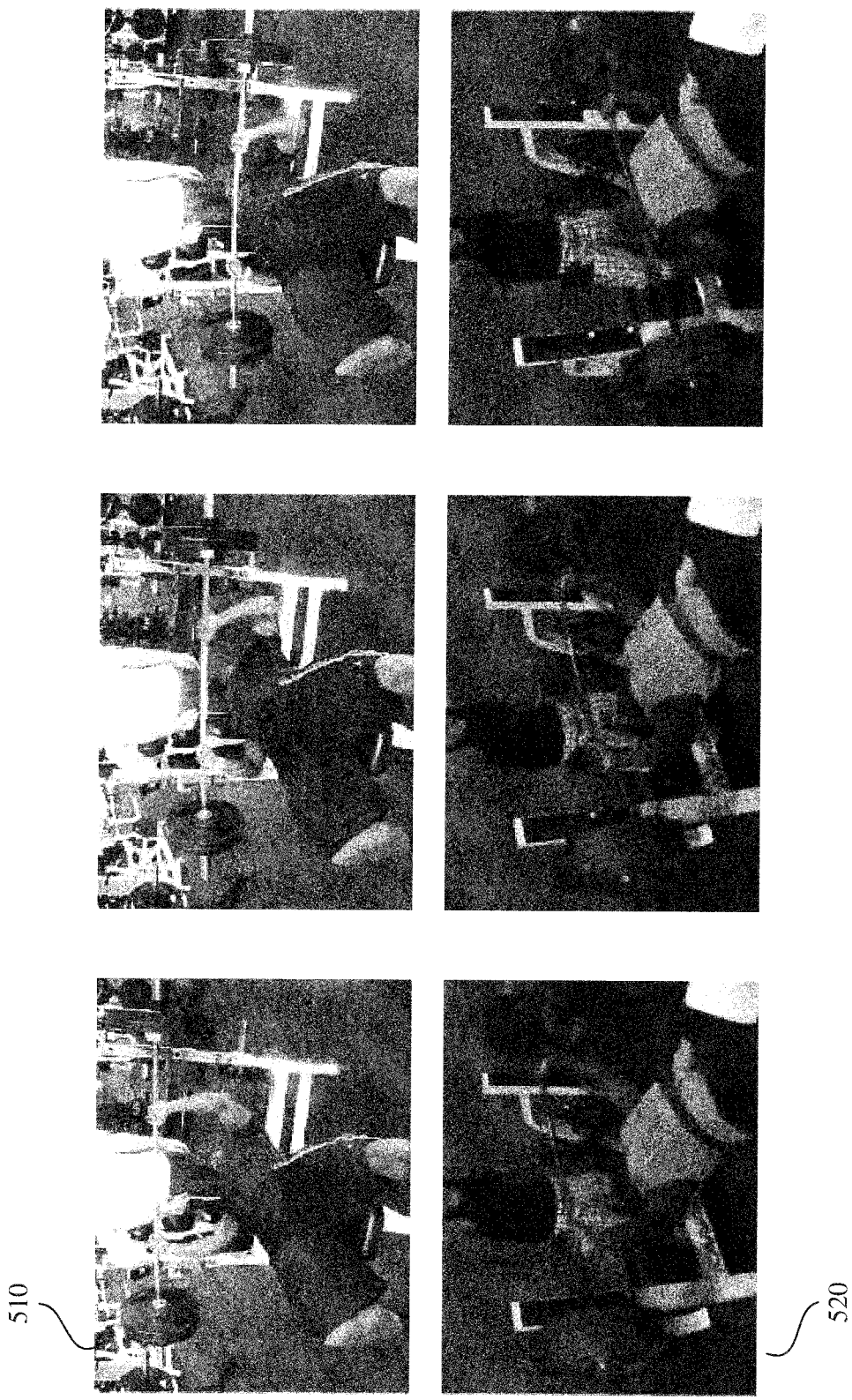
FIG. 5 shows example of synchronized video frames from the cost matrix and synchronization path according to an exemplary embodiment.

FIG. 4 shows exemplary results 410 and 420 of cost matrices computed for two different videos by the method 200. Specifically, the matrix 410 on the left corresponds to videos containing a continuous high kick motion while the matrix 420 on the right corresponds to videos containing a repetitive bench press motion. The low cost nonlinear synchronization path is shown as the lighter shaded regions of FIG. 4. Accordingly, the synchronization path may be computed as the lowest cost path. Thus, this lowest cost synchronization path may be described as a nonlinear mapping that establishes frame-to-frame temporal correspondence between the two input action videos. Furthermore, by navigating along the path, a synchronized version of the input videos may be created and may be overlayed in a retimed video sequence for analysis.

Given two input videos, the synchronization path may indicate which frame of the first video corresponds to which frame of the second video. The exemplary method 200 may use general motion features based on point trajectories and apply a multi-temporal scale approach. Accordingly, this multi-temporal scale approach allows for the input action videos to be synchronized, even when the input videos feature different appearances and different speeds.

Once the cost matrix is computed, and the nonlinear synchronization path is obtained, the path may then be used to establish temporal correspondence of video frames. FIG.

5 shows examples of such frames 500 from the cost matrix and synchronization path described in method 200. Specifically, a viewer can observe within each of the three frames on both videos 510 and 520 that the weigh bar is at the top position, the middle position and bottom position, respectively.

Figure 6:
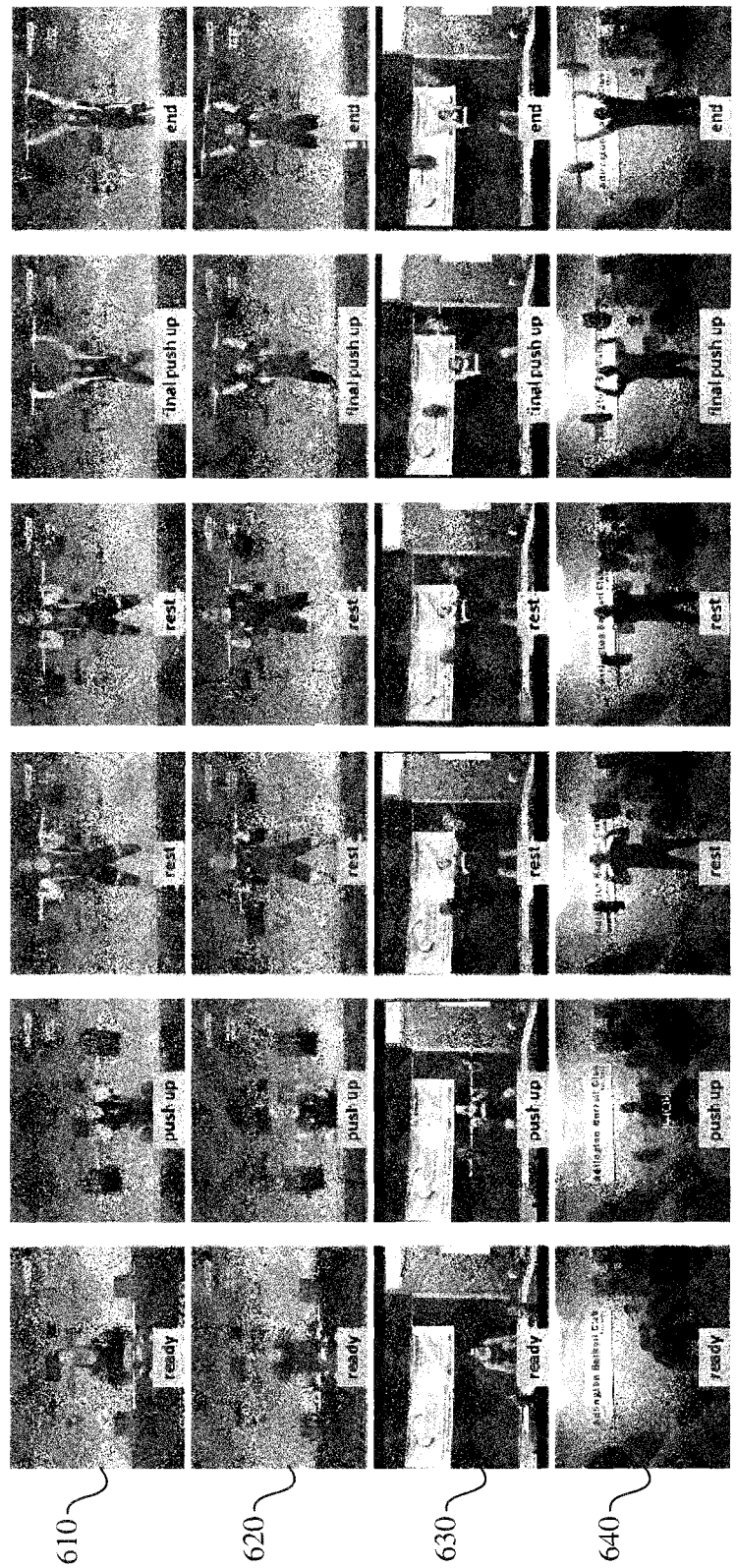
FIG. 6 shows a further example of synchronization of multiple input action videos, as well as labelling propagation through text boxes according to an exemplary embodiment.

FIG. 6 shows a further example 600 of automatic synchronization of multiple input action videos 610-640, as well as labelling propagation though text boxes. Specifically, the example 600 shows a representative depiction of multiple input action videos 610-640 of a clean and jerk activity. The exemplary systems and methods described herein may be seamlessly applied to scenes having a similar appearance (e.g., row 1 of video 610 and row 2 of video 620) and having a different appearance (e.g., row 3 of video 630 and row 4 of video 640). For instance, the background, clothing and appearance of the athletes appear different. Furthermore, the video sequence in row 4 of video 640 contains overlayed text (e.g., "140k") in one frame. Despite each of these variables and challenges, the exemplary systems and methods is able to successfully synchronize the action in these videos.

In addition to synchronization, the systems and methods may also be applied for video labelling. For instance, the steps of the action, such as the clean and jerk in example 600, may be manually annotated in a reference video. Based on the synchronization path, the systems and methods can identify which frame of each other video corresponds to which frame of the reference video. Therefore, the labels may then be automatically propagated to the other videos. Labelling of every single frame may be achieved manually. However, the proposed approach only requires one video to be labelled and then the label propagation may operate in a fully automatic manner.

Figure 7:
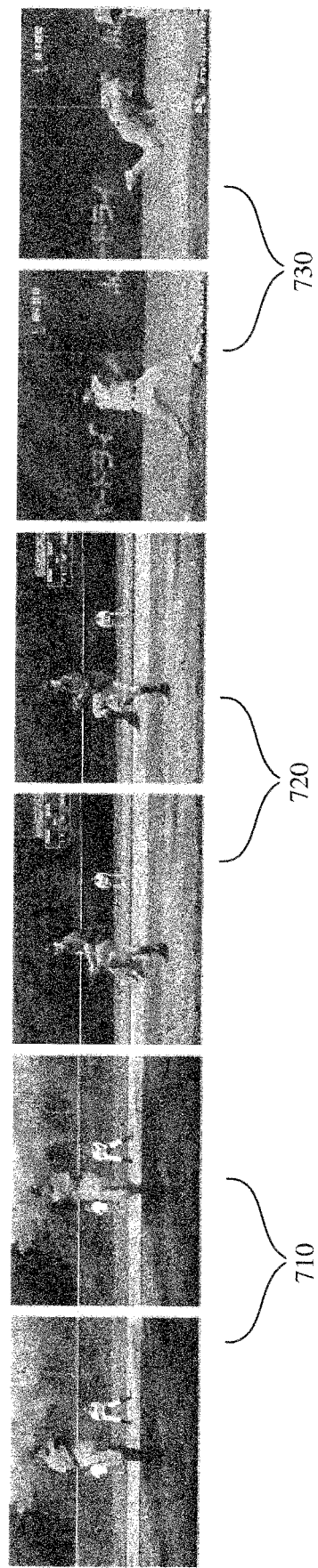
FIG. 7 shows an example of creation of action snapshots of a baseball pitch from three input action videos according to an exemplary embodiment.

The exemplary video synchronization systems and methods also allow for the creation of action snapshots. FIG. 7 shows an example 700 of action snapshots of a baseball pitch from three input action videos. Action snapshots may be generated from different videos of different people by sampling specific frames of the synchronized videos. It is also possible to choose a number of frames of each input video. For instance, example 700 depicts a result from three input action videos 710-730 in which two frames per video were selected based on the synchronization information as multiple action snapshots.

As described above, the exemplary embodiments aim to synchronize the motion visible in multiple input action videos. If several motions are visible, the viewer or user may be allowed to specify which motions or which parts to be synchronized, for example, by selecting an action of interest or an area of interest in the image. For instance, in FIG. 1, the professional dancer of the reference video (the top video sequence) has a hip motion that the beginner dancer (the lower video sequence) did not replicate. Accordingly, the user may indicate that the arms motion should be used for synchronization and not the hip motion. This indication may be performed by allowing the user to highlight (e.g., draw a rectangle) over the area of interest on the input videos. Thus, the exemplary systems and methods may ignore any of the motions depicted in the video that lie outside of the designated area of interest.

Figure 8:
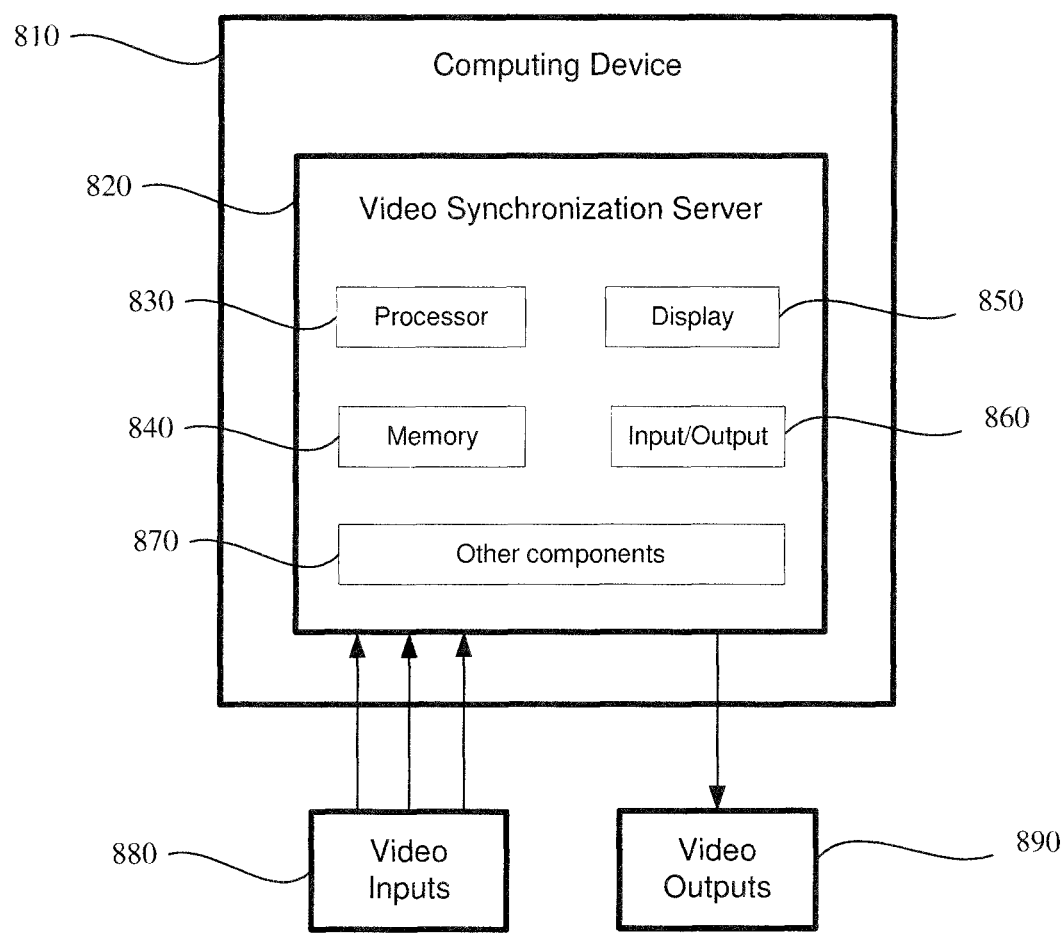
FIG. 8 shows an exemplary system for achieving nonlinear synchronization of action videos according to the exemplary embodiments discussed herein.

FIG. 8 shows an exemplary system 100 for achieving nonlinear synchronization of action videos according to the exemplary embodiments discussed herein. The system 800 may utilize a computing device 810 to receive a plurality of input video inputs 880 to generate a synchronized video output 890. The computing device 810 may include an exemplary video synchronization server 820 that may include a processor 830, a memory arrangement 840, a display device 850, an input/output ("I/O") device 860, and other components 870 (e.g., an audio input device, an audio output device, a battery, a data acquisition device, ports to electrically connect to other electronic devices, etc.).

The exemplary processor 830 may receive user input from the display 850 and/or through other components of the device 870 (e.g., keyboard, mouse, etc.). The exemplary memory 840 may store instructions, including instructions related to the above-described software methods (e.g., method 200 of FIG. 2) and application (e.g., a video synchronization application), executable by the processor 830. Therefore, a user of the computing device 810 may interact with the software application stored in the memory 840 of the computing device 810. The processor 830 may process these user interactions and adjust the content and modeling configurations.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method of synchronizing a reference video with an input video, comprising:

extracting first motion data from the input video having a first set of frames, wherein the input video includes a first scene during which a first action is performed;

extracting second motion data from the reference video having a second set of frames, wherein the reference video includes a second scene during which a second action is performed, wherein the first action and the second action are different based on at least one of (i) a time when the first action is performed and a time when the second action is performed or (ii) a performer of the first action and a performer of the second action;

computing motion descriptors for each frame in the first set of frames and each frame in the second set of frames based on the first motion data and the second motion data, respectively;

generating a temporal correspondence between the first set of frames and the second set of frames using a non-linear mapping between the first set of frames and the second set of frames based on the motion descriptors; and generating a video sequence that includes the input video synchronized with the reference video based on the generated temporal correspondence.

2. The method of claim 1, wherein the non-linear mapping comprises:

computing matching costs of frame pairs, each frame pair being a first frame from the first set of frames and a second frame from the second set of frames, based on a distance between the motion descriptors associated with the first frame and the second frame, respectively;

storing the costs in a cost matrix; and obtaining a non-linear mapping path as the lowest-cost path in the cost matrix.

3. The method of claim 2, wherein the motion descriptors are each represented by a histogram, and wherein the matching cost of one of the frame pairs is calculated based on a distance between the histograms associated with the first and second frames of the frame pair.

4. The method of claim 1, wherein the first motion data and the second motion data comprise point trajectories of multiple temporal span.

5. The method of claim 4, wherein the first motion data and the second motion comprise displacement trajectories computed based on the point trajectories.

6. The method of claim 5, wherein the displacement trajectories are normalized.

7. The method of claim 1, further comprising:
determining that a reference frame from the second set of frames in the reference video includes an annotation; and
inserting the annotation into the input video at a frame that temporally corresponds to the reference frame.

8. A device, comprising:
a processor coupled to a memory, wherein the processor is programmed for synchronizing a reference video with an input video by:
extracting first motion data from the input video having a first set of frames, wherein the input videos includes a first scene during which a first action is performed;
extracting second motion data from the reference video having a second set of frames, wherein the reference video includes a second scene during which a second action is performed, wherein the first action and the second action are different based on at least one of (i) a time when the first action is performed and a time when the second action is performed or (ii) a performer of the first action and a performer of the second action;
computing motion descriptors for each frame in the first set of frames and each frame in the second set of frames based on the first motion data and the second motion data, respectively;
generating a temporal correspondence between the first set of frames and the second set of frames using a non-linear mapping between the first set of frames and the second set of frames based on the motion descriptors; and
generating a video sequence that includes the input video synchronized with the reference video based on the generated temporal correspondence.

9. The device of claim 8, wherein the non-linear mapping performed by the processor comprises:
computing matching costs of frame pairs, each frame pair being a first frame from the first set of frames and a second frame from the second set of frames, based on a distance between the motion descriptors associated with the first frame and the second frame, respectively;
storing the costs in a cost matrix; and
obtaining a non-linear mapping path as the lowest-cost path in the cost matrix.

10. The device of claim 9, wherein the motion descriptors are each represented by a histogram, and wherein the matching cost of one of the frame pairs is calculated based on a distance between the histograms associated with the first and second frames of the frame pair.

11. The device of claim 8, wherein the first motion data and the second motion data comprise point trajectories of multiple temporal span.

12. The device of claim 11, wherein the first motion data and the second motion comprise displacement trajectories computed based on the point trajectories.

13. The device of claim 12, wherein the displacement trajectories are normalized.

14. The device of claim 8, wherein the processor further determines that a reference frame from the second set of frames in the reference video includes an annotation, and inserts the annotation into the input video at a frame that temporally corresponds to the reference frame.

15. A non-transitory computer readable storage medium with an executable program stored thereon, wherein the program instructs a microprocessor to perform operations to synchronize a reference video with an input video comprising:
extracting first motion data from the input video having a first set of frames, wherein the input video includes a first scene during which a first action is performed;
extracting second motion data from the reference video having a second set of frames, wherein the reference video includes a second scene during which a second action is performed, wherein the first action and the second action are different based on at least one of (i) a time when the first action is performed and a time when the second action is performed or (ii) a performer of the first action and a performer of the second action;
computing motion descriptors for each frame in the first set of frames and each frame in the second set of frames based on the first motion data and the second motion data, respectively;
generating a temporal correspondence between the first set of frames and the second set of frames using a non-linear mapping between the first set of frames and the second set of frames based on the motion descriptors; and
generating a video sequence that includes the input video synchronized with the reference video based on the generated temporal correspondence.

16. The non-transitory computer readable storage medium of claim 15, wherein the non-linear mapping comprises:
computing matching costs of frame pairs, each frame pair being a first frame from the first set of frames and a second frame from the second set of frames, based on a distance between the motion descriptors associated with the first frame and the second frame, respectively;
storing the costs in a cost matrix; and
obtaining a non-linear mapping path as the lowest-cost path in the cost matrix.

17. The non-transitory computer readable storage medium of claim 16, wherein the motion descriptors are each represented by a histogram, and wherein the matching cost of one of the frame pairs is calculated based on a distance between the histograms associated with the first and second frames of the frame pair.

18. The non-transitory computer readable storage medium of claim 15, wherein the first motion data and the second motion data comprise point trajectories of multiple temporal span.

19. The non-transitory computer readable storage medium of claim 18, wherein the first motion data and the second motion comprise displacement trajectories computed based on the point trajectories.

20. The non-transitory computer readable storage medium of claim 15, wherein the operations further comprise:
determining that a reference frame from the second set of frames in the reference video includes an annotation; and
inserting the annotation into the input video at a frame that temporally corresponds to the reference frame.

* * * * *